United States Patent
Shin

(10) Patent No.: US 10,850,558 B2
(45) Date of Patent: Dec. 1, 2020

(54) APPARATUS FOR REDUCING TIRE NOISE

(71) Applicants: Hyundai Motor Company, Seoul (KR); Kia Motors Corp., Seoul (KR)

(72) Inventor: Sang Min Shin, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 289 days.

(21) Appl. No.: 16/042,076

(22) Filed: Jul. 23, 2018

(65) Prior Publication Data
US 2019/0210405 A1  Jul. 11, 2019

(30) Foreign Application Priority Data
Jan. 10, 2018 (KR) .................. 10-2018-0003326

(51) Int. Cl.
| B60B 21/12 | (2006.01) |
| B60B 21/10 | (2006.01) |
| B60C 19/00 | (2006.01) |
| B60C 29/02 | (2006.01) |

(52) U.S. Cl.
CPC ............ B60B 21/12 (2013.01); B60B 21/102 (2013.01); B60C 19/002 (2013.01); *B60B 2900/133* (2013.01); *B60C 29/02* (2013.01)

(58) Field of Classification Search
CPC ....... B60B 21/12; B60B 25/22; B60C 19/002; G10K 11/172
See application file for complete search history.

(56) References Cited

U.S. PATENT DOCUMENTS

| 7,690,410 | B2 * | 4/2010 | Kamiyama | B60B 3/044 |
| | | | | 152/381.5 |
| 9,381,772 | B2 * | 7/2016 | Rathje | B60B 21/023 |
| 2018/0022151 | A1 * | 1/2018 | Kamiyama | G10K 11/172 |
| | | | | 301/95.104 |

FOREIGN PATENT DOCUMENTS

| JP | 06106903 A | * | 4/1994 | .......... B60C 19/002 |
| JP | 2004306653 A | * | 11/2004 | |
| JP | 2005-297836 A | | 10/2005 | |
| JP | 2008-279873 A | | 11/2008 | |
| JP | 5091828 B2 | | 12/2012 | |
| KR | 10-2017-0067951 A | | 6/2017 | |
| KR | 20170116321 A | * | 10/2017 | |

* cited by examiner

*Primary Examiner* — Kip T Kotter
(74) *Attorney, Agent, or Firm* — Morgan, Lewis & Bockius LLP

(57) ABSTRACT

An apparatus for reducing tire noise may include a rim with a tire mounted thereto in a wheel; a resonance tube provided along an external circumferential surface of the rim, and configured such that a first edge portion thereof in a width direction is provided with a first flange locked to a first side wall of the rim and a second edge portion thereof in the width direction is provided with a second flange; a strap provided along the external circumferential surface of the rim to surround the second flange of the resonance tube such that the resonance tube is brought into contact with the external circumferential surface of the rim; and a protruding portion configured to protrude from the external circumferential surface of the rim to prevent the resonance tube and the strap from being moved in the width direction thereof.

10 Claims, 2 Drawing Sheets

APPARATUS FOR REDUCING TIRE NOISE

CROSS REFERENCE TO RELATED APPLICATION

The present application claims priority to Korean Patent Application No. 10-2018-0003326, filed Jan. 10, 2018, the entire contents of which is incorporated herein for all purposes by this reference.

BACKGROUND OF THE INVENTION

Field of the Invention

The present invention relates to an apparatus for reducing tire noise, the apparatus being provided with a resonance tube to reduce a resonance noise of a tire.

Description of Related Art

A resonance noise that can be generated in the internal space of a tire while driving acts as a noise of a vehicle. The resonance noise inside a tire is caused by a random vibration transmitted from the road surface to the tire which vibrates the air in the internal space of the tire.

To reduce the resonance noise inside a tire, a resonance tube having a shape extending in the circumferential direction of a rim may be provided. The resonance tube is configured such that an internal spaced is provided thereinside, and the resonance noise inside the tire is reduced according to Helmholtz resonator principle.

The resonance tube may be, for example, integrally provided at a predetermined position of the wheel, but in the instant case, it is difficult to integrally provide the resonance tube to the wheel, cost is relatively high, and reliability after molding is poor, whereby the function as a resonance tube is decreased.

For another example, opposite sides of the resonance tube which is separately manufactured may be engaged with protrusions, but in the instant case, due to the weak bonding force, the resonance tube may be separated or partially separated by repeated vibration of the tire while driving, and thus, whistling may occur.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus configured for reducing a tire noise, wherein a resonance tube is provided to a wheel to reduce a resonance noise of a tire, and the resonance tube is prevented from being partially separated from the wheel in the axial direction, the radial direction, or the rotation direction of the wheel.

In various aspects of the present invention, there is provided an apparatus configured for reducing tire noise, the apparatus including: a rim with a tire mounted thereto in a wheel; a resonance tube provided along an external circumferential surface of the rim, and configured such that a first edge portion thereof in a width direction is provided with a first flange locked to a first side wall of the rim and a second edge portion thereof in the width direction is provided with a second flange; a strap provided along the external circumferential surface of the rim to surround the second flange of the resonance tube such that the resonance tube is brought into close contact with the external circumferential surface of the rim; and a protruding portion configured to protrude from the external circumferential surface of the rim to prevent the resonance tube and the strap from being moved in the width direction thereof.

The first side wall of the rim may be provided with a locking groove with the first flange being inserted thereinto.

The strap may be provided with an ear portion configured such that an internal circumferential surface thereof forms an accommodation space by being bent radially outward along a longitudinal direction and returning to an original radial direction thereof.

The apparatus configured for reducing tire noise may further include a rod configured such that a first end portion thereof is pressed into the accommodation space of the ear portion and a second end portion thereof extends to a second side wall of the rim, wherein the second side wall of the rim is provided with a valve hole with a TPMS valve being inserted thereinto, and a rod hole with the rod being inserted thereinto.

The rod hole may be provided within a predetermined distance from the valve hole along a rotation direction of the rim.

After the rod is pressed into the accommodation space of ear portion, an external circumferential surface of the ear portion may be pressed inward by a caulking process to prevent movement of the rod.

The caulking process may be performed to press an outermost point of the ear portion radially inward and to press opposite circumferential sides of the ear portion toward the rod.

According to the apparatus configured for reducing tire noise configured as described above, the resonance tube is prevented from being moved or separated from the wheel in the axial direction or the radial direction of the wheel, whereby it is possible to prevent damage or whistling due to separation of the resonance tube.

Furthermore, since the external diameter tolerance of the wheel is absorbed when the strap is assembled to the wheel, it is possible to improve the ease of assembly of the strap.

Furthermore, since the ear portion of the strap and the TPMS sensor are provided to be adjacent to each other, it is possible to prevent damage to the tire and the strap when mounting/removing the tire.

Furthermore, since the strap is prevented from being rotated along the rotation direction of the wheel, it is possible to prevent noise or damage caused when the ear portion of the strap bumps against the TPMS detector.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
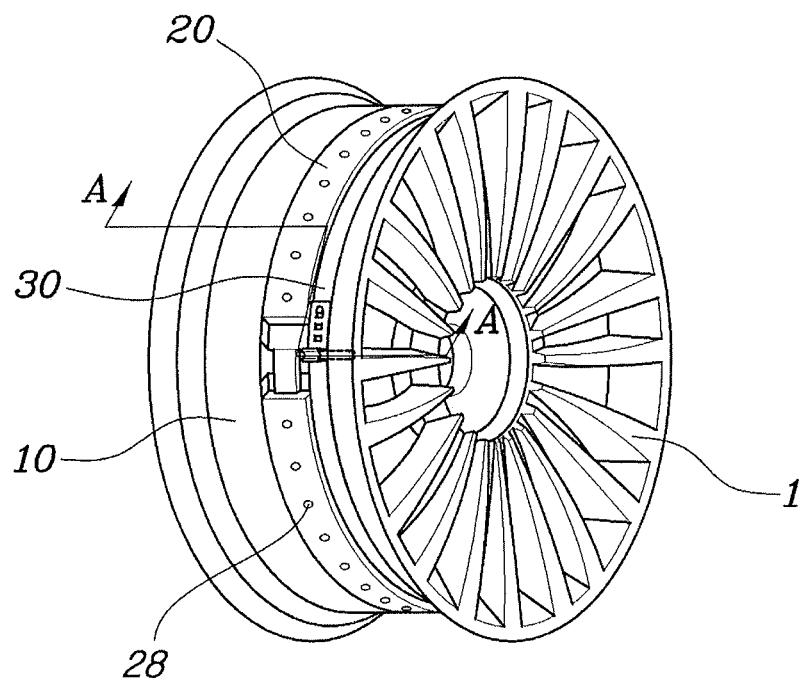
FIG. 1 is a perspective view showing an apparatus configured for reducing tire noise according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an apparatus configured for reducing tire noise according to exemplary embodiments of the present invention will be described in more detail with reference to the accompanying drawings.

Figure 2:
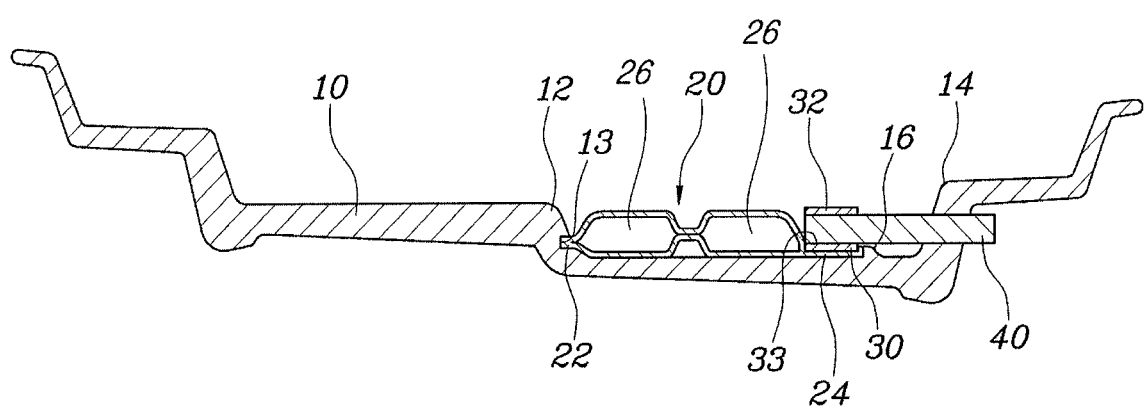
FIG. 2 is a sectional view taken along line A-A of FIG. 1.

FIG. 1 is a perspective view showing an apparatus configured for reducing tire noise according to an exemplary embodiment of the present invention; and FIG. 2 is a sectional view taken along line A-A of FIG. 1.

Referring to FIGS. 1 to 2, an apparatus configured for reducing tire noise of the present invention includes: a rim 10 with a tire mounted thereto in a wheel 1; a resonance tube 20 provided along an external circumferential surface of the rim 10, and configured such that a first edge portion thereof in a width direction is provided with a first flange 22 locked to a first side wall 12 of the rim 10 and a second edge portion thereof in the width direction is provided with a second flange 24; a strap 30 provided along the external circumferential surface of the rim 10 to surround the second flange 24 of the resonance tube 20 such that the resonance tube 20 is brought into close contact with the external circumferential surface of the rim 10; and a protruding portion 16 configured to protrude from the external circumferential surface of the rim 10 to prevent the resonance tube 20 and the strap 30 from being moved in the width direction thereof.

To be more specific, the wheel 1 is provided with the rim 10 to allow a tire to be mounted thereto. The rim 10 forms an external circumferential surface of the wheel 1, and includes a fixed element for mounting a tire. FIGS. 1 to 2 show a shape of the rim 10.

The resonance tube 20 is provided along the external circumferential surface of the rim 10 and has a longitudinal direction parallel to the circumferential direction of the rim 10, wherein a resonance space 26 extending in the longitudinal direction is formed inside the resonance tube. A plurality of holes 28 communicating with the resonance space 26 is formed at an upper portion of the resonance tube at positions spaced from each other along the longitudinal direction such that the tire and the resonance space 26 communicate with each other. Accordingly, the resonance noise inside the tire is reduced by the resonance tube 20.

In an exemplary embodiment of the present invention, the resonance space 26 may be in plural and extend along a longitudinal direction of the resonance tube 20 in parallel.

As shown in FIG. 2, in an exemplary embodiment of the present invention, the resonance tube 20 is configured such that the first flange 22 and the second flange 24 extend respectively from opposite edge portions in the width direction thereof, wherein the first flange 22 is locked to the first side wall 12 of the rim 10.

Meanwhile, the strap 30 is provided to surround the second flange 24 of the resonance tube 20. Here, by the strap 30, the resonance tube 20 is maintained to be brought into close contact with the external circumferential surface of the rim 10, and Accordingly, the resonance tube 20 is prevented from being separated radially outward of the rim 10.

Furthermore, in an exemplary embodiment of the present invention, the external circumferential surface of the rim 10 is provided with the protruding portion 16 protruding outward therefrom to prevent the resonance tube 20 and the strap 30 from being moved in the width direction thereof. Here, the protruding portion 16 is configured to be brought into close contact with the second flange 24 of the resonance tube 20 and the strap 30, whereby the resonance tube 20 and the strap 30 are prevented from being moved in an axial direction of the rim 10, and accordingly, it is possible to prevent damage caused when the resonance tube 20 is separated to or prevent noise.

Herein, the first side wall 12 of the rim 10 may be provided with a locking groove 13 with the first flange 22 inserted thereinto.

In other words, the resonance tube 20 is locked such that the first flange 22 is inserted into the locking groove 13 of the rim 10, and the second flange 24 is configured to be pressed by the strap 30, whereby the opposite sides of the resonance tube in the width direction are brought into close contact with the rim 10 and locked thereto, and accordingly, it is possible to prevent the resonance tube from being moved or separated along the radial direction of the rim 10.

Furthermore, since both the resonance tube 20 and the strap 30 are inserted between the first side wall 12 of the rim 10 and the protruding portion 16, being prevented from being moved or separated in the axial direction of the rim 10, and accordingly, it is possible to prevent damage or whistling.

Meanwhile, the strap 30 may be provided with an ear portion 32 configured such that an internal circumferential surface thereof forms an accommodation space 33 while being bent radially outward along a longitudinal direction and returning to an original radial direction thereof.

Figure 3:
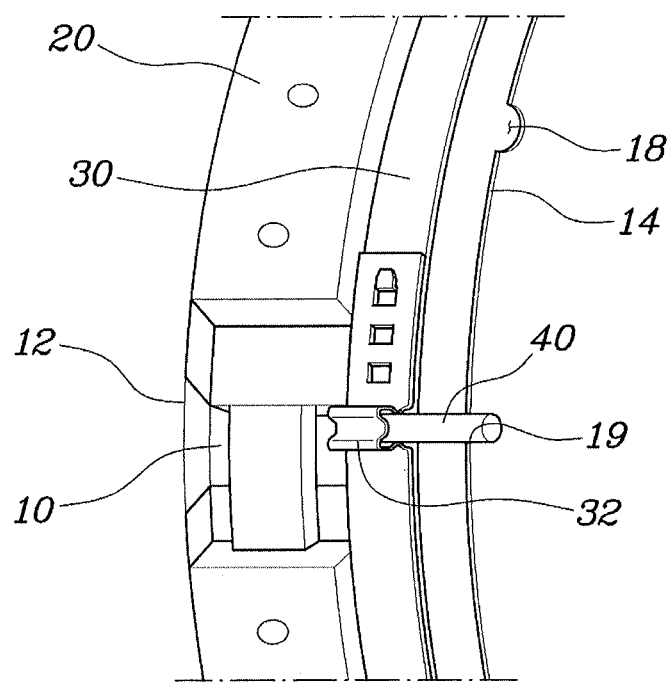
FIG. 3 is a detailed view showing the apparatus configured for reducing tire noise according to the exemplary embodiment of the present invention.
Figure 4:
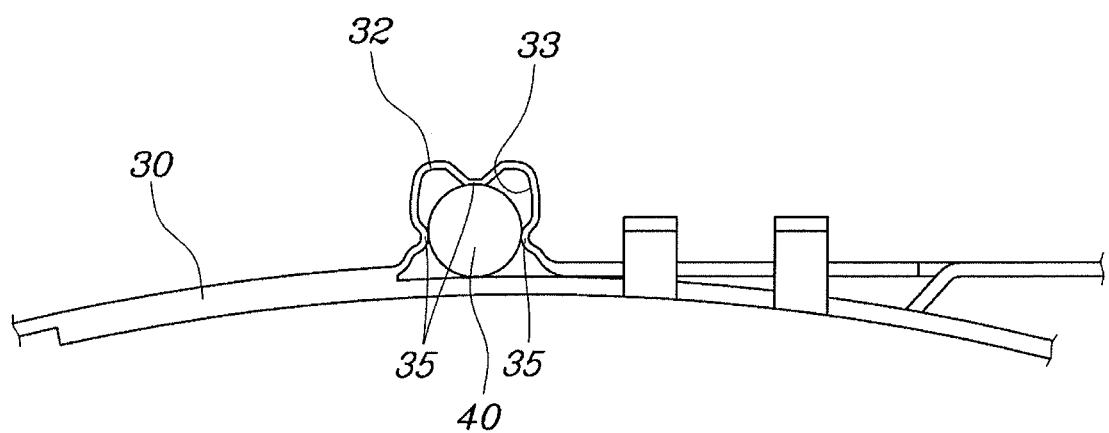
FIG. 4 is a side view showing a strap and a rod assembly according to the exemplary embodiment of the present invention.

FIG. 3 is a detailed view showing the apparatus configured for reducing a tire noise according to the exemplary embodiment of the present invention; and FIG. 4 is a side view showing the strap 30 and the rod assembly of the present invention.

As shown in FIG. 2, FIG. 3 and FIG. 4, since the strap 30 is provided with the vertically inverted-U shaped ear portion 32 by being bent, when the strap 30 is assembled to the wheel 1, even if the external diameter tolerance of the wheel 1 is large, the assembly is possible while the ear portion 32 is opened, and thus, it is possible to improve the ease of assembly of the apparatus configured for reducing tire noise.

Herein, the apparatus configured for reducing a tire noise of the present invention may further include a rod 40 configured such that a first end portion thereof is pressed into the accommodation space 33 of the ear portion 32 and a second end portion thereof extends to a second side wall 14 of the rim 10, wherein the second side wall 14 of the rim 10 is provided with a valve hole 18 with a TPMS valve inserted thereinto, and a rod hole 19 with the rod 40 inserted thereinto.

In other words, as shown in FIG. 2 and FIG. 3, the rod 40 is provided to be pressed into the accommodation space 30 of the ear portion 32 formed at the strap 30, and is provided to be inserted into the rod hole 19 of the second side wall 14 formed at the rim 10.

Accordingly, the strap 30 is locked to the rim 10 through the rod 40, the rim 10 is prevented from being rotated along the external circumferential surface, and thus, it is possible to prevent wear and noise that can occur when the strap 30 is rotated along the external circumferential surface of the rim 10. Furthermore, when the resonance tube 20 is also rotated due to the rotation of the strap 30, it is possible to prevent deterioration of the noise reduction effect through the resonance tube 20, and is possible to prevent damage or noise caused when the rod 40 collides with the TPMS valve.

FIG. 3 shows the second side wall 14 of the rim 10 cut to a height of the strap 30 to clearly illustrate the relationship between valve hole 18 and rod 40.

To be more specific, the rod hole 19 may be provided within a predetermined distance from the valve hole 18 along a rotation direction of the rim 10.

In other words, as shown in FIG. 3, the rod hole 19 is formed within the predetermined distance from the valve hole 18, such that the Tire Pressure Monitoring System (TPMS) valve and the rod 40 are provided at locations adjacent to each other.

When the tire is assembled to the wheel 1, assembly is performed while rotating the wheel 1 in the state where the upper portion of the tire is pressed down. Here, in the case where the TPMS valve and the rod 40 is provided at locations not adjacent to each other, the bead of the tire rubs against the ear portion 32 of the strap 30 during the assembly process, and the tire may wear out.

On the other hand, as in an exemplary embodiment of the present invention, if the valve hole 18 and the rod hole 19 are provided at locations adjacent to each other such that the TPMS valve and the rod 40 are provided at locations adjacent to each other, when the tire is assembled to the wheel 1, the bead of the tire fails to reach the strap 30 by the TPMS valve, and the friction between the tire and the strap 30 does not occur. Accordingly, it is possible to minimize tire wear and noise.

After the rod 40 is pressed into the accommodation space 33 of the ear portion 32, the caulking process where the external circumferential surface of the ear portion 32 is pressed inward is performed, preventing movement of the rod 40.

Even though the rod 40 is pressed into the ear portion 32 of the strap 30, the rod 40 may be moved by a gap between the ear portion 32 and the accommodation space 33 depending on the surrounding environment. If the rod 40 is moved, noise may be generated since the strap 30 is rotated a small amount or the rod 40 and the rim 10 bump against each other when the strap 30 is applied with a force to rotate.

Accordingly, as shown in FIG. 4, in an exemplary embodiment of the present invention, when the rod 40 is pressed into the ear portion 32, the caulking process is performed additionally on external circumferential surface, preventing movement of the rod 40.

To be more specific, the caulking process is performed to press an outermost point of the ear portion 32 radially inward and press opposite circumferential sides of the ear portion 32 toward the rod 40.

Referring to FIG. 4, it may be seen that the caulking is performed such that the outermost point of the ear portion 32 is pressed radially inward, and the opposite circumferential sides of the ear portion 32 are pressed toward the rod 40.

In an exemplary embodiment of the presently claimed invention, the ear portion 32 may include at least a locking protrusion 35 protruding inwards of the ear portion 32.

Accordingly, as the internal circumferential surface of the accommodation space 33 of the ear portion 32 is pressed for the locking protrusion 35 to be brought into contact with the external circumferential surface of the rod 40, the rod 40 is prevented from being moved in the rotation direction or the radial direction of the rim 10, whereby it is possible to prevent noise and durability deterioration.

According to the apparatus configured for reducing tire noise configured as described above, the resonance tube is prevented from being moved or separated from the wheel in the axial direction or the radial direction of the wheel, whereby it is possible to prevent damage or whistling due to separation of the resonance tube.

Furthermore, since the external diameter tolerance of the wheel is absorbed when the strap is assembled to the wheel, it is possible to improve the ease of assembly of the strap.

Furthermore, since the ear portion of the strap and the TPMS sensor are provided to be adjacent to each other, it is possible to prevent damage to the tire and the strap when mounting/removing the tire.

Furthermore, since the strap is prevented from being rotated along the rotation direction of the wheel, it is possible to prevent noise or damage caused when the ear portion of the strap bumps against the TPMS sensor.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for reducing tire noise, the apparatus comprising:
   a rim with a tire mounted to the rim in a wheel;
   a resonance tube provided along an external circumferential surface of the rim, wherein a first edge portion of the resonance tube in a width direction of the resonance tube is provided with a first flange locked to a first side wall of the rim and a second edge portion of the resonance tube in the width direction is provided with a second flange;

a strap provided along the external circumferential surface of the rim to surround the second flange of the resonance tube, wherein the resonance tube is brought into contact with the external circumferential surface of the rim; and a protruding portion protruding from the external circumferential surface of the rim, wherein the second flange of the resonance tube is mounted to the protruding portion to prevent the resonance tube and the strap from being moved in the width direction of the rim, wherein the strap is provided with an ear portion, and wherein an internal circumferential surface of the ear portion forms an accommodation space by being bent radially outward along a longitudinal direction of the ear portion and returning to an original radial direction of the ear portion.

2. The apparatus of claim 1, wherein the first side wall of the rim is provided with a locking groove with the first flange being inserted thereinto.

3. The apparatus of claim 1, wherein the ear portion includes a locking protrusion protruding inwards of the ear portion.

4. The apparatus of claim 3, further including:

a rod, wherein a first end portion of the rod is pressed into the accommodation space of the ear portion and a second end portion of the rod extends to a second side wall of the rim, wherein the second side wall of the rim is provided with a valve hole with a Tire Pressure Monitoring System (TPMS) valve being inserted thereinto, and a rod hole with the second end portion of the rod being inserted thereinto.

5. The apparatus of claim 4, wherein the rod hole is provided within a predetermined distance from the valve hole along a rotation direction of the rim.

6. The apparatus of claim 4, wherein after the rod is pressed into the accommodation space of the ear portion, an external circumferential surface of the ear portion is pressed inward by a caulking process to form the locking protrusion to prevent movement of the rod.

7. The apparatus of claim 6, wherein the caulking process is performed to press an outermost point of the ear portion radially inward and to press opposite circumferential sides of the ear portion toward the rod.

8. The apparatus of claim 1, wherein the resonance tube include a resonance space extending a longitudinal direction of the resonance tube.

9. The apparatus of claim 8, wherein the resonance space is in plural and extends along the longitudinal direction of the resonance tube in parallel to each other.

10. The apparatus of claim 9, wherein the resonance tube include a hole formed on an external surface thereof and fluidically communicating with the resonance space through the hole.

* * * * *